Dec. 27, 1938.  A. ROSABAL  2,142,071

PLASTERING MACHINE

Filed March 24, 1938  2 Sheets-Sheet 1

Inventor
Antonio Rosabal,
By Shepherd & Campbell
Attorneys

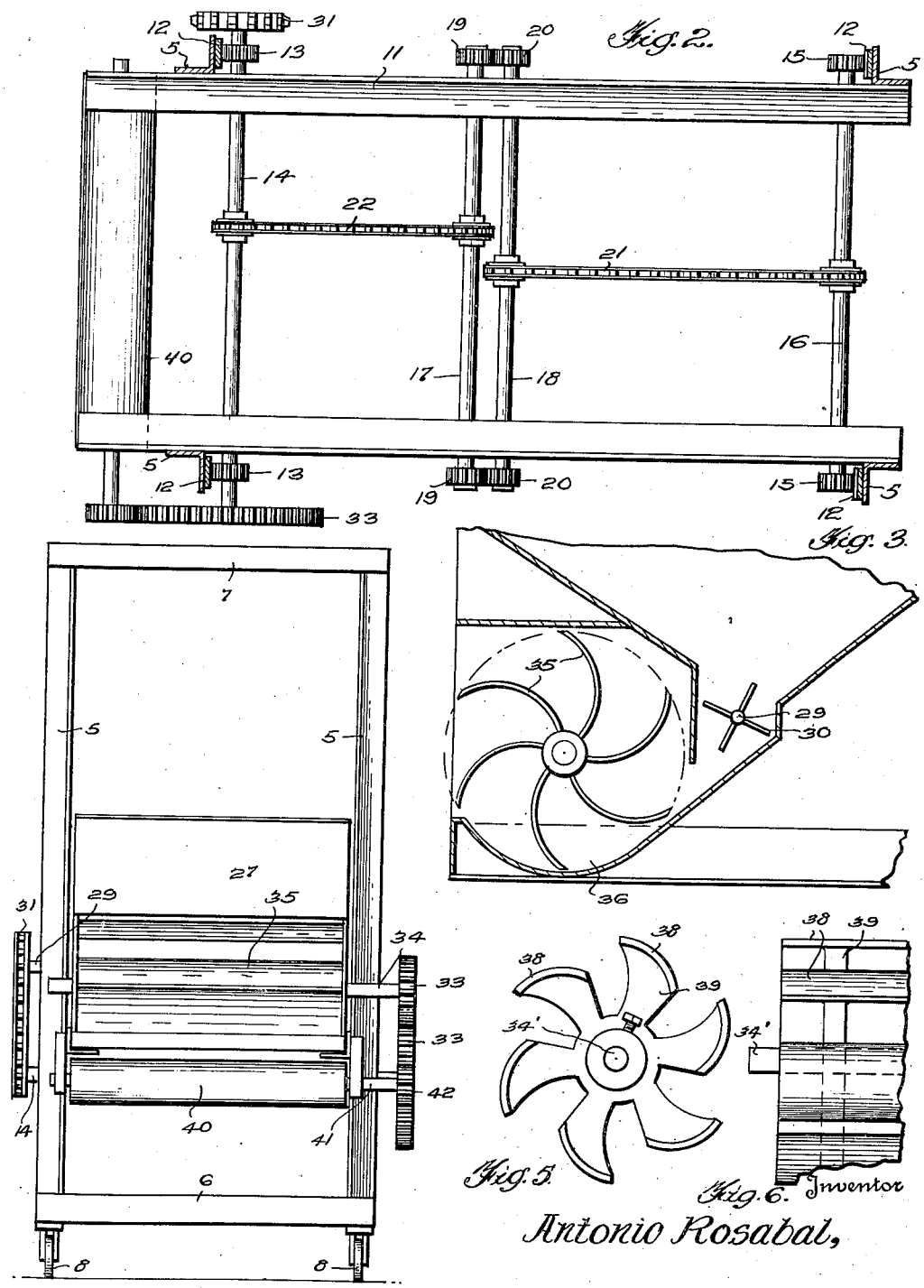

Patented Dec. 27, 1938

2,142,071

UNITED STATES PATENT OFFICE 2,142,071

PLASTERING MACHINE

Antonio Rosabal, Alajuela, Costa Rica

Application March 24, 1938, Serial No. 197,941
In Costa Rica August 8, 1937

6 Claims. (Cl. 72—130)

The object of the present invention is to provide a machine that may be economically manufactured, easily handled, and which will apply plaster to walls with great rapidity and in such manner that a straight, true and accurately troweled surface may be had.

In the accompanying drawings, in which like reference characters designate corresponding parts throughout the several views:

Fig. 2 is a plan view of the vertically movable frame hereinafter described, with the vertical standards of the wheeled frame in section;

Fig. 3 is a vertical sectional view through the plaster-receiving hopper of the machine;

Fig. 4 is a front elevation of the machine;

Fig. 5 is an end elevation of a modified form of rotative troweling device, hereinafter described, and Fig. 6 is a side view of the troweling device of Fig. 5.

Figure 1:
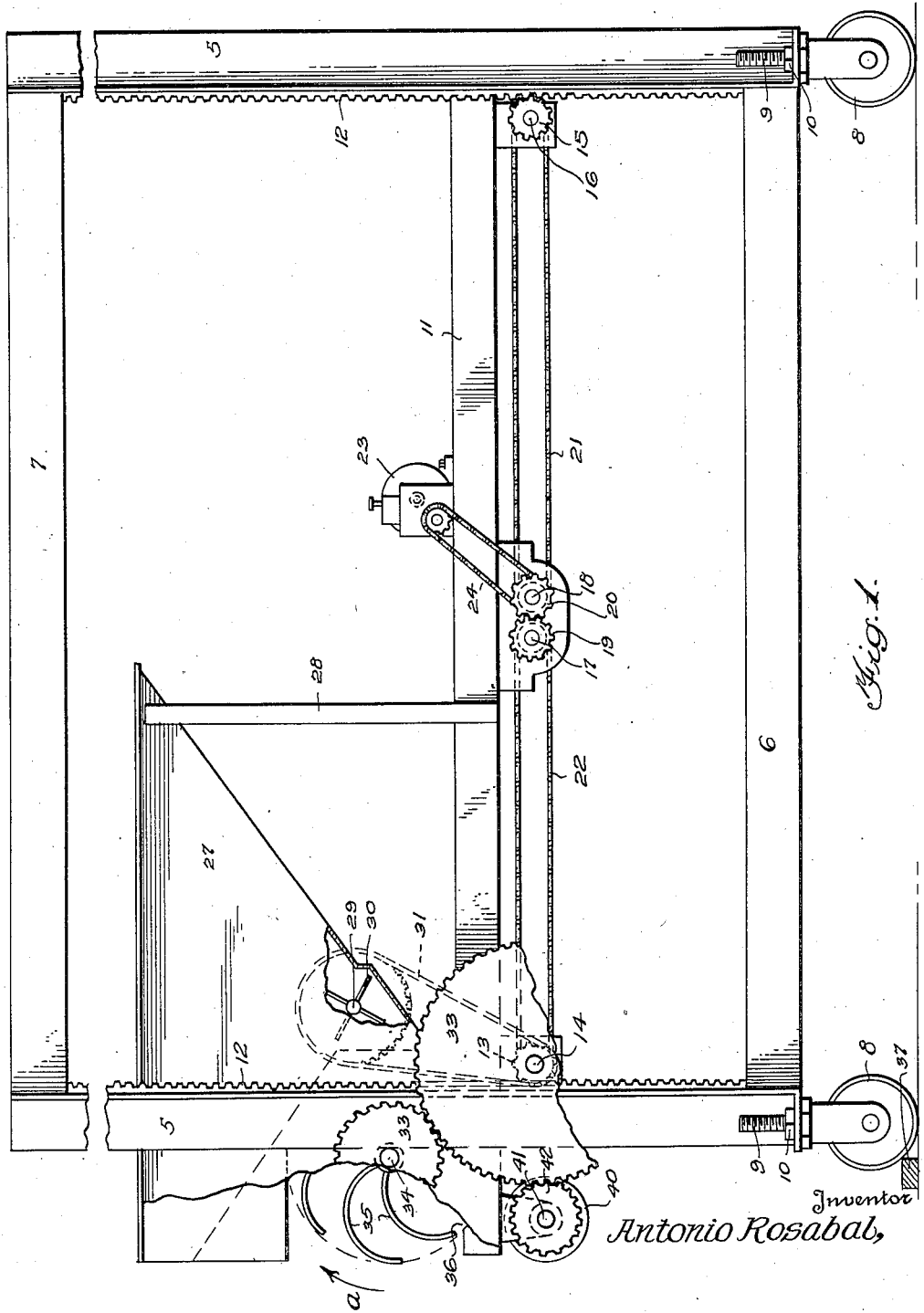
Figure 1 is a side elevation, with parts broken away, of a plastering machine constructed in accordance with the invention.

The machine of the present invention comprises a movable frame consisting of the four corner uprights 5, base rails 6, top rails 7 and caster wheels 8. The caster wheels may be provided with threaded shanks 9 and adjusting nuts 10, by which the frame may be leveled when desired. A vertically movable frame 11 is mounted to move up and down within the wheeled frame just described. To that end, the uprights 5 are provided with racks 12.

Pinions 13, upon the ends of a transverse shaft 14, located at one end of the frame 11, mesh with the corresponding racks 12, while pinions 15, upon a transverse shaft 16, located at the opposite end of the frame 11, mesh with the adjacent racks 12. A pair of intermediate transverse shafts 17 and 18 are provided with intermeshing gears 19 and 20. Suitable sprocket connections 21 connect shafts 16 and 17, and corresponding sprocket connections 22 connect the shafts 14 and 18.

Thus, rotation of the pinion 15 toward the left in Fig. 1 will cause said pinion to ride upwardly with respect to its rack 12. The sprocket connections 21 will impart left-hand rotation to shaft 17, and this, through the gears 19 and 20, will impart a right-hand rotation to the shaft 18.

This movement of shaft 18 will, in turn, be translated into a right-hand rotation of shaft 14 through the sprocket connections 22, and this will cause the pinions 13 on said shaft to ride upwardly with respect to their racks 12. Thus, the frame 11 will be caused to rise with respect to the wheeled frame.

Any suitable means may be employed for driving the pinions 13 and 15, such for example as an electric motor 23, having suitable sprocket connections 24 with any one of the transverse shafts, such for example as the shaft 18. The motor and its associated parts are of a conventional form, and I have indicated at 25 the casing of a reducing gear mechanism by which the speed of shaft 18 may be suitably adjusted with respect to the speed of the motor.

Further, I have indicated at 26 the casing of a conventional limit switch for the motor, so that after the frame 11 has made a complete stroke upwardly, the current to the motor will be automatically cut off and said frame 11 and the parts carried thereby will descend by gravity preparatory to repeating the operation.

A hopper 27 is mounted upon the frame 11 and moves bodily therewith, the rear end or overhanging portion of this hopper being braced and supported by standards 28, which project upwardly from the frame 11. A transverse shaft 29, disposed in the lower portion of the hopper, carries suitable agitating blades 30 for delivering plaster to the discharge mouth of the hopper and to the trowel blades presently to be described. The shaft 29 is driven from shaft 16 through the medium of suitable sprocket connections 31.

The shaft 16 also carries upon its outer end a relatively large gear wheel 32, which meshes with a gear wheel 33 upon the outer end of the trowel shaft 34. The shaft 34 carries trowel blades 35, of a nature to carry the plaster out of the channel 36 constituting the discharge mouth of the hopper, and to throw the plaster gently but rapidly against the surface to be covered.

The machine is placed at such a distance from said surface as to secure the desired thickness of plaster. In order to secure an absolutely true line, a suitable guide or ground strip 37 may be nailed to the floor to limit the point to which the machine may be advanced toward the wall. By keeping the machine squarely against this strip at all times, the desired accuracy of result may be had.

The trowel blades move in the direction indicated by the arrow. That is to say, they travel upwardly, and they not only apply the plaster but they trowel or press it firmly and evenly into place. The shape of these trowel blades may be varied in many ways. They may be simple curved plates of concave-convex form as shown in Fig. 1, or the trowels may be of the form shown in Fig. 5, wherein the trowel surfaces consist of plates 38 that are mounted upon disks or spiders 39.

In this case, the spiders would be carried by a shaft 34', corresponding to shaft 34. However, it will be observed that while the plates 38 are of arcuate form, with their convex faces disposed outwardly, their faces are eccentrically disposed with respect to the shaft by which they are carried.

Since these plates or blades will move in the direction indicated by the arrow *a* in Fig. 1, it follows that the leading edge of these blades will lie further from the wall to be plastered than the trailing edge, and that a certain amount of plaster will be caught in the enlarged throat thereby provided so that as the trailing edge comes around, this trapped plaster will be forcibly and firmly pressed into place.

However, the trowel blades 35 and 38 are not alone relied upon to secure the desired final smooth and burnished finish. The final finish is imparted to the plaster by a smooth, polished, preferably metallic roller 40. This roller is mounted upon a transverse shaft 41 and said shaft carries a pinion 42, which meshes with the gear 31.

It will be observed that with the pinion 15 rotating to the left or in such direction as to elevate the frame 11, roller 40 will be caused to rotate toward the right or in such direction as to cause its contacting surface to move upwardly with respect to the plastered surface. Since this action of the roller is in opposition to any tendency of gravity to loosen the plaster, it follows that the action of the roller serves the double function of smoothing and straightening the plaster and of aiding in its firm application.

It will be observed that the pinion 42 is of smaller diameter than the gear 33 and that since both 42 and 33 are driven from the same gear 31, the rotation of roller 40 will be materially faster than the rotation of the troweling blades. Thus, a certain burnishing effect will be imparted to the plaster to give a very smooth finish. While I prefer to use a smooth metallic roller at 40, it is to be understood that the invention is not limited to any particular material for this roller.

In use, the machine is brought into close relation to the wall to be plastered. A plaster of the proper consistency is supplied to the hopper, and as the hopper moves upwardly the plaster is deposited upon the surface to be covered. Through the use of this machine, I am able to cover large areas in a very short time, while at the same time turning out work of a superior quality. By the use of the caster wheels, the machine may be moved longitudinally along the wall as fresh areas have to be reached.

It is to be understood that the invention is not limited to the precise construction set forth but that it includes within its purview whatever changes fairly come within either the terms or the spirit of the appended claims.

Having described my invention, what I claim is:

1. In combination, a wheeled supporting frame, a traveling frame mounted to move vertically with respect to the supporting frame, means for moving the traveling frame vertically with respect to the supporting frame, a hopper for plaster, movable with the traveling frame, a rotative troweling device comprising a horizontally disposed shaft extending transversely across the front of the machine, and a plurality of separate trowel blades carried thereby, and means for imparting movement to said shaft, said troweling blades first throwing the plaster upon the wall and thereafter wiping and pressing it into place with a troweling action.

2. In combination, a wheeled supporting frame, a traveling frame mounted to move vertically with respect to the supporting frame, means for moving the traveling frame vertically with respect to the supporting frame, a hopper for plaster, movable with the traveling frame, a rotative troweling device extending transversely across the front of the machine and carrying a plurality of separate trowel blades, means for imparting rotation to said troweling device, and a smooth finishing roller disposed beneath the troweling device and driven in unison therewith and in such direction that its contacting surface travels upwardly with respect to the plastered wall said trowel blades first throwing the plaster upon the wall and thereafter wiping and pressing it into place, and the smooth finishing roller thereafter rubbing the plaster upwardly.

3. In a plastering machine of the character described, the combination with a vertically movable frame, a support therefor, a horizontally disposed troweling device extending across the front of the movable frame comprising a plurality of separate, upwardly moving, troweling blades, a finishing roller disposed beneath the troweling device, and means for driving the troweling device and the finishing roller in the same direction but with the finishing roller moving faster than the troweling device.

4. A machine of the character described comprising a frame mounted upon caster wheels to adapt it for ready movement in any direction and consisting of a plurality of uprights and connecting members extending between said uprights, vertical racks upon said uprights, a horizontally disposed frame, a transverse shaft at each end of the horizontally disposed frame, a pair of pinions carried by each of said shafts, which mesh with the corresponding racks, connections between said transverse shafts for moving them in unison in such direction as to cause the traveling frame to move upwardly with respect to the wheeled frame and the following instrumentalities carried by and bodily movable with the movable frame, to wit: a hopper having an arcuate bottom, a troweling device mounted above said arcuate bottom and lying in substantially concentric relation with respect thereto and comprising a plurality of wiping and troweling blades, and a finishing roller disposed beneath the troweling device and across the front of the machine, and means for driving the finishing roller and the troweling device in unison and with the contacting surface of the finishing roller moving upwardly.

5. A structure as recited in claim 4 wherein the troweling faces of the troweling device lie in eccentric relation to the arcuate bottom of the hopper with their leading edges farther from said bottom than their trailing edges.

6. A structure as recited in claim 4 wherein the driving means for the finishing roller comprises mechanism geared to move said finishing roller faster than the troweling device.

ANTONIO ROSABAL.